June 28, 1932.   V. WILLOUGHBY   1,864,571
ARTICULATED CAR
Filed Nov. 1, 1930
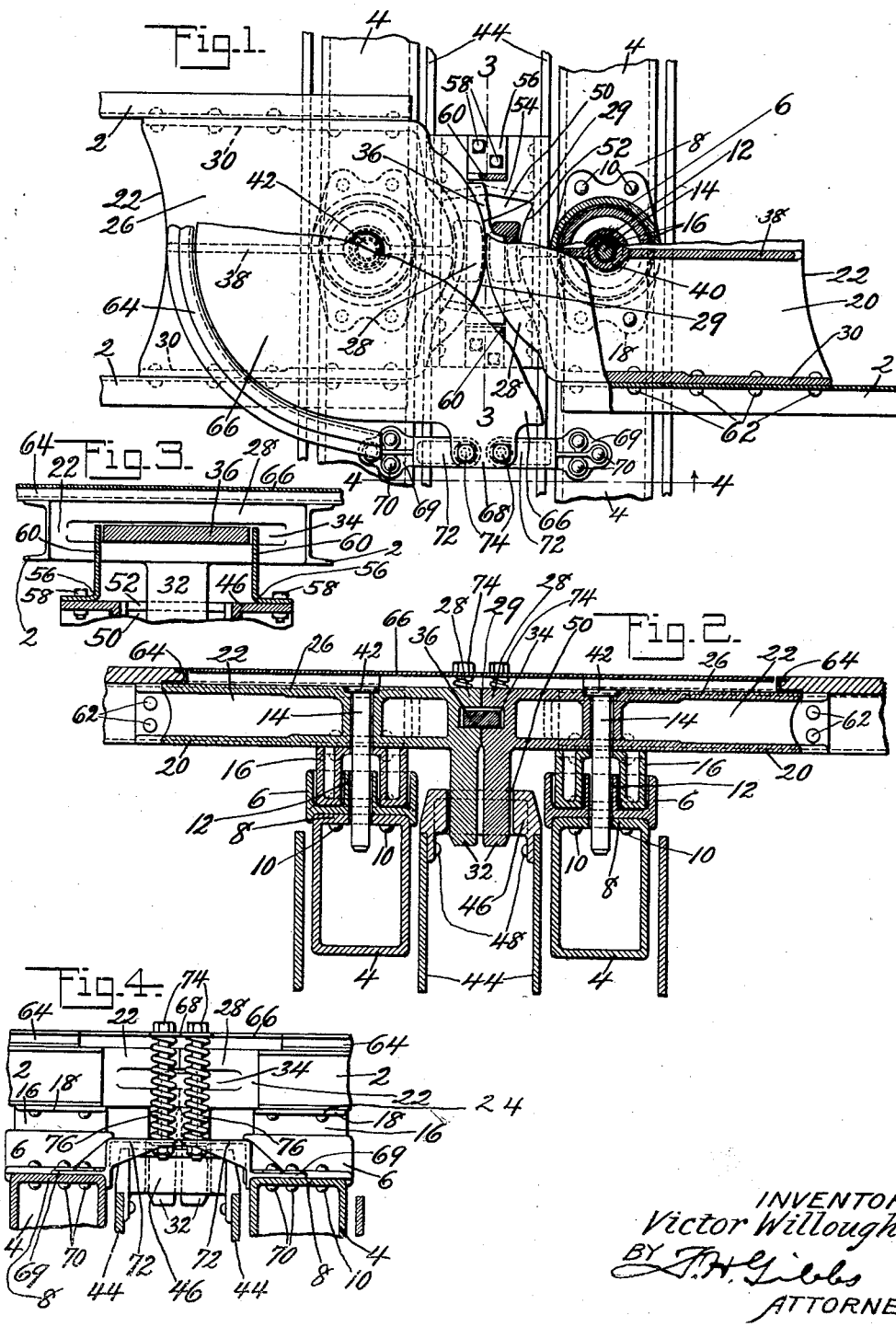
INVENTOR
Victor Willoughby
BY J. H. Gibbs
ATTORNEY Patented June 28, 1932

1,864,571

UNITED STATES PATENT OFFICE

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed November 1, 1930. Serial No. 492,690.

This invention relates to articulated cars of the type in which a single truck is arranged beneath the adjacent ends of two car bodies, and has particular reference to the articulated joint for the adjacent end portions of adjacent car bodies.

One object of this invention is the provision of a connection for the adjacent end portions of adjacent bodies of an articulated car which will permit free swiveling of the respective bodies in a horizontal plane.

Another object of this invention is the provision of means for preventing relative sidewise and vertical shifting of the adjacent end portions of adjacent bodies of an articulated car.

Still another object of the present invention is the provision of an articulated car comprising car bodies, the adjacent end portions of which are provided with body connection castings having abutting projections at their forward ends, extended into a transverse truck member which latter furnishes a means for transmitting traction stresses from the bodies to the truck and from one body to the other.

A further object of the present invention is the provision of an articulated car in which a locking key is loosely arranged between the adjacent end portions of adjacent car bodies whereby to prevent relative vertical shifting only of the car bodies.

A still further object of this invention is the provision of means for supporting a foot plate which extends between the adjacent end portions of adjacent bodies of an articulated car from the truck and more particularly from the truck bolsters whereby said foot plate is maintained in a horizontal position notwithstanding the relative positions of the car bodies.

Other objects and advantages of this invention will be apparent from the following description taken in conjunction with the accompanying drawing in which:

Fig 1 is a top plan view of the articulated joint of the present invention, the view having certain parts broken away and other parts shown in section, and said view also showing, fragmentarily, a pair of truck bolsters and the center sills of car body underframes.

Fig. 2 is a sectional view through the articulated joint of the present invention.

Fig. 3 is a sectional view on the line 3—3, Fig. 1, and

Fig. 4 is a view taken on the line 4—4, Fig. 1.

The drawing does not show the construction of the adjacent end portions of adjacent car bodies as they may be of any preferred or desired construction. Further, the drawing does not disclose a complete car truck as the parts of the truck, other than those shown and described herein, may assume any preferred or desired form.

In the drawing, in which similar characters of reference designate similar parts in the several views, the present invention is applied to and forms the articulated joint for two car bodies which are provided with suitable underframes, including spaced channels 2 forming the center sills. The adjacent end portions of the car bodies are supported by a single or common truck known in the art as a pivot truck and which includes a pair of spaced bolsters 4 provided with circular center plates 6 riveted to the upper surfaces 8 of the bolsters as shown at 10. Obviously if desired, the center plates 6 may be formed integral with the bolsters. The center plates 6 are provided with concentric apertured studs 12 through which pivot pins 14 extend; the latter also extending through the end portions of the respective car body underframes as shown clearly in Fig. 2, and said pins also extend through body center plates 16. The body center plates 16 are preferably of the form shown in Fig. 2 and comprise circular double-walled castings which fit around the studs 12 in the truck center plates 6 and are provided with top flanges 18 (see Fig. 4) riveted to the lower walls 20 of body connection castings 22, as shown clearly at 24.

The body connection castings or center castings for the respective car bodies are identical and each thereof comprises a body portion having the before mentioned bottom wall 20 and a top wall 26. The castings are provided with a front wall 28, curved to the form shown clearly in Fig. 1 to provide centrally arranged buffing areas 29. Depending from the forward ends of the castings 22 and preferably from the front wall 28 thereof approximately midway between the side walls 30 of the castings are integral projections 32, the purpose of which will be hereinafter more clearly pointed out. The front walls 28 or more specifically the buffing areas 29 of the body center castings are provided with horizontally arranged recesses 34 which, when the car bodies are assembled, are alined as shown clearly in Fig. 2 to define an open ended pocket which loosely receives a locking key 36 in the form of a straight metal bar.

The body portions of the castings 22 are reinforced by an internal longitudinal web or rib 38 which merges with an internal apertured bearing 40 through which the before mentioned pins 14 extend, the latter having heads 42 countersunk in the upper walls 26 of the castings whereby to support the pins.

The center bearings 16 may, of course, be cast integral with the castings 22 if desired but in the instance shown are separate elements riveted to the lower walls 20 of the castings, as before mentioned.

As shown in the drawing the end walls 28 of the castings abut each other at the areas 29 to transmit buffing shocks from one body to the other, and the projections 32 which depend from the forward ends of the castings 22 extend into a transverse truck member positioned between bolsters 4 and which comprises the spaced truck transoms 44 and a casting 46 secured thereto as by rivets 48 and provided with an elongated opening 50 therein in which the projections 32 are arranged. As shown clearly in Fig. 1, the side walls 52 of the opening are curved or arcuate in shape, this being desirable in view of the fact that swiveling of the car bodies takes place in the connected bearings 6 and 16 which results in an arcuate movement of the projections 32.

Adjacent the end walls 54 of the opening 50, abutments 56 are provided which are secured to the casting by means of suitable fasteners such as the bolts 58, said abutments being angles having vertically arranged flanges 60 which prevent accidental dislodgment of the key 36 from the complementary or alined recesses in the end walls 28 of the castings, inasmuch as the abutments are positioned opposite the alined recesses, as clearly shown in Fig. 1.

The castings 22 are of such width that the side walls 30 thereof rest against and are secured to the channels 2 of the center sills by means of suitable fasteners such as the rivets 62.

The end portion of each car body is provided with a threshold casting 64, arcuate in shape and mounted on the castings 22 (see Fig. 2). Extending between the castings 64 and hence bridging the space between the car bodies is an oval-shaped foot plate 66 provided with oppositely arranged projecting lugs 68 on its side edges; the lugs, as clearly shown in Fig. 1, being arranged in the space between the bolsters 4.

It is desirable and indeed necessary that the foot plate 66 be maintained in a substantially horizontal position notwithstanding the relative positions of the car bodies, and the foot plate in this invention is supported by the truck and more specifically by the bolsters forming a part of said truck, and, as shown in Fig. 4, the bolsters are provided with supporting elements or brackets having an attaching portion 69 secured to the upper surfaces of the bolsters as by rivets 70; the brackets including an offset supporting portion 72; the supporting portions 72 of adjacent brackets extending between each other and having posts 74 extended thereinto. The posts 74 extend through the foot plate 66 and are normally retained in their proper position by means of coil springs 76 bearing between the under surface of the foot plate 66 and the top surface of the supporting portions 72 of the brackets. It will be apparent that the means for mounting the foot plate serves to retain the latter in a horizontal position at all times relative to the car bodies notwithstanding the relative positions of the latter. The foot plate supporting means maintains the foot plate substantially fixed with respect to the car bodies which latter, in swiveling, move relative to the foot plate.

From the above description it is believed that the construction shown in the drawing will be fully apparent to those skilled in the art. In operation pulling stresses are taken by the connected body and truck center bearings and also are taken by the casting 46 due to the engagement of the extension of projections 32 therein. The forward ends of the castings 22 being arranged in substantially abutting relation, serve to take up buffing shocks and said forward ends are retained in abutting relation at practically all times as swiveling movement of the respective bodies occurs at the connected body and truck center bearings about pins 14 as centers and the forward ends of the castings will move in an arc. Relative sidewise shifting of the respective car bodies is prevented by the circular conformation of the body and truck center bearings, and excessive relative vertical shifting of the bodies is prevented by the key 36 due to its arrangement in the abutting ends 28 of the castings 22.

The drawing herein illustrates one embodiment of the invention but it is to be understood that they are for illustrative purposes only and various changes in the form and proportions of the construction may be made within the scope of the appended claims without departing from the spirit of the invention.

What is claimed is:

1. In an articulated car comprising a plurality of car bodies, means connecting the adjacent end portions of said bodies comprising a truck beneath the adjacent end portions of said bodies provided with a pair of bolsters, body and truck bearings for connecting the bodies respectively with the bolsters, body castings to which the body bearings are secured having their forward ends arranged in abutting relation and extended into a truck part, the said abutting ends having alined recesses therein, and a locking key disposed in said recesses for limiting relative vertical shifting of the bodies.

2. In an articulated car comprising a plurality of car bodies arranged end to end, a truck for supporting the adjacent end portions of said bodies having a pair of independent bolsters each carrying a truck center plate, body center bearings cooperating with the respective truck center plates, a transverse truck member intermediate the bolsters with which the adjacent end portions of said bodies are engaged for transmitting pulling stresses from the bodies to the truck and from one body to the other, and means loosely mounted in the adjacent end portions of the bodies for limiting relative vertical shifting of the latter.

3. In an articulated car comprising a plurality of car bodies, a truck for supporting the adjacent end portions of said bodies having a pair of independent bolsters each provided with a truck center plate, body center bearings engaged respectively with the truck center plates, pivot pins extending through the adjacent end portions of the bodies into the bearings and center plates and providing a means for transmitting pulling stresses from the bodies to the truck, the end portions of said bodies having depending projections extending into a truck part to cooperate therewith.

4. In an articulated car comprising a plurality of car bodies, a truck for supporting the adjacent end portions of said bodies having a pair of independent bolsters each provided with a truck center plate, body center bearings engaged respectively with the truck center plates, pivot pins extending through the adjacent end portions of the bodies into the bearings and center plates and providing a means for transmitting pulling stresses from the bodies to the truck, the end portions of said bodies having depending projections extending into a truck part to cooperate therewith, and means loosely mounted in the adjacent end portions of the bodies above the projections and intermediate the connected body and truck center bearings for limiting relative vertical shifting of the bodies.

5. In an articulated car comprising a plurality of car bodies, a truck for supporting the adjacent end portions of said bodies, a transverse truck member, projections at the end portions of the car bodies extending into the transverse truck member for transmitting pulling stresses from one body to the other and from said bodies to the truck, the adjacent end portions of said car bodies being arranged in substantially abutting relation to define buffing areas to transmit buffing shocks from one body to the other, and a member loosely mounted in said adjacent end portions for limiting relative vertical shifting of the bodies.

6. In an articulated car comprising a plurality of car bodies, a truck for supporting the adjacent end portions of said bodies provided with a pair of bolsters, connected body and truck center bearings between each bolster and the respective end portions of said bodies, the end portions of said bodies being arranged in abutting relation to take buffing shocks, and a rigid member loosely mounted in the abutting end portions of said bodies above and intermediate the connected body and truck center bearings for limiting relative vertical shifting of the bodies.

7. In an articulated car comprising a plurality of car bodies, a truck for supporting the adjacent end portions of said bodies provided with a pair of spaced bolsters each having a truck center plate, body center bearings engaged respectively with the truck center plates, body connection castings secured to the bodies and to which the body center bearings are connected, a transverse truck member intermediate the bolsters, projections at the adjacent ends of said castings extending into the truck member and cooperating therewith to transmit pulling stresses from the bodies to the truck, said adjacent ends of the castings being arranged in abutting relation, and a key supported in the adjacent ends of said castings for limiting relative vertical shifting of the bodies.

8. In an articulated car comprising a plurality of car bodies, a pair of bolsters for respectively supporting the adjacent end portions of said bodies, said end portions terminating in buffing surfaces and having adjacently arranged depending projections, a transverse truck member intermediate the bolsters into which the projections extend, and a rigid member loosely arranged in the buffing surfaces above the projections for limiting relative vertical shifting of the bodies 9. A connection for the adjacent end portions of two bodies of an articulated car comprising a pair of connected body and truck bearings arranged in independently functioning spaced relation, and a member loosely mounted in said end portions in a plane above the bearings and substantially midway therebetween.

10. In an articulated car comprising a plurality of car bodies, the adjacent end portions of two of said bodies being arranged in abutting relation for transmitting buffing shocks from one body to the other, an anticlimber member arranged in said end portions, and projections depending from the adjacent end portions of the bodies extending into a truck part for transmitting pulling stresses from the bodies to the truck and from one body to the other, said projections being shiftable horizontally relative to each other in said truck part.

11. In an articulated car comprising a pair of car bodies, a truck having a pair of bolsters, a body center bearing for each of said bodies, a truck center bearing on each bolster cooperating respectively with the body center bearings, a foot plate bridging the space between the car bodies, and means carried by said bolsters for supporting the foot plate in a substantially fixed position relative to the car bodies regardless of the relative positions of said bodies.

12. In an articulated car, a truck having a pair of bolsters, a car body end portion supported by each bolster and adapted to swivel relative thereto, a foot plate between the adjacent end portions of said bodies, and resiliently mounted means carried by the bolsters for supporting the foot plate in a substantially fixed position relative to the truck whereby swiveling of the bodies is relative to the foot plate.

13. In an articulated car comprising a pair of car bodies, a truck for supporting the adjacent end portions of said bodies having a pair of bolsters, a foot plate lapping the adjacent end portions of said bodies, and resiliently mounted elements carried by the bolsters for supporting the foot plate in a substantially fixed position relative to the truck to permit swiveling movement of said bodies relative to the foot plate.

14. In an articulated car comprising a plurality of car bodies having underframes, means for limiting relative vertical shifting of the bodies comprising a bar loosely arranged in the adjacent end portions of said underframes, and means adjacent each side of said adjacent end portions supported by a truck part for retaining the bar in position.

15. In an articulated car comprising a plurality of car bodies, a truck beneath the adjacent end portions of said bodies, body center castings secured at the adjacent end portions of said bodies and arranged in abutting relation, said body center castings having alined recesses formed in the abutting surfaces thereof defining a horizontally arranged pocket, an anticlimber member loosely arranged in said pocket, a plurality of connected body and truck center bearing members and means intermediate the center bearing members engaging a truck part for transmitting pulling stresses from one body to the other and from the bodies to the truck.

16. A connection for the adjacent end portions of two bodies of an articulated car comprising connected body and truck bearings arranged in independently functioning spaced relation, a member loosely mounted in said end portions in a plane above the bearings and substantially midway therebetween, and means formed on said end portions extending into a truck part between said bearings.

17. In an articulated car comprising a pair of car bodies, a truck for supporting the adjacent end portions of said bodies, connected body and truck center bearings arranged in independently functioning spaced relation, a member loosely mounted in the adjacent end portions of said bodies for restraining the latter against excessive relative vertical shifting, and means formed on said adjacent end portions extended into a truck part between said bearings for restraining the bodies against excessive relative sidewise shifting.

18. In an articulated car comprising a plurality of car bodies, the adjacent end portions of said bodies having recesses formed therein, a truck for supporting the adjacent end portions of said bodies, connected body and truck center bearings for supporting the adjacent end portions of said bodies for relative horizontal swiveling movement, a member positioned in said recesses in the end portions for restraining the latter against excessive relative vertical shifting and projections depending from said end portions in adjacent relation and extended into a truck part for restraining the end portions against excessive relative sidewise shifting.

In witness whereof I have hereunto set my hand.

VICTOR WILLOUGHBY.